United States Patent
Stehle

(10) Patent No.: US 8,960,018 B2
(45) Date of Patent: Feb. 24, 2015

(54) PITOT TUBE TRAVERSE ASSEMBLY

(71) Applicant: Dieterich Standard, Inc., Boulder, CO (US)

(72) Inventor: John Henry Stehle, Boulder, CO (US)

(73) Assignee: Dieterich Standard, Inc., Boulder, CO (US)

(*) Notice: Subject to any disclaimer, the term of this patent is extended or adjusted under 35 U.S.C. 154(b) by 160 days.

(21) Appl. No.: 13/826,146

(22) Filed: Mar. 14, 2013

(65) Prior Publication Data

US 2014/0260671 A1 Sep. 18, 2014

(51) Int. Cl.
*G01F 1/46* (2006.01)
*G01P 5/16* (2006.01)

(52) U.S. Cl.
CPC .... *G01F 1/46* (2013.01); *G01P 5/16* (2013.01)
USPC ........................................ 73/861.66

(58) Field of Classification Search
None
See application file for complete search history.

(56) References Cited

U.S. PATENT DOCUMENTS

| | | | | | |
|---|---|---|---|---|---|
| 1,508,017 | A | | 9/1924 | Greve | |
| 4,523,477 | A | * | 6/1985 | Miller | 73/861.02 |
| 4,703,661 | A | * | 11/1987 | Evers | 73/861.66 |
| 5,520,048 | A | * | 5/1996 | Traina et al. | 73/335.06 |
| 5,817,950 | A | * | 10/1998 | Wiklund et al. | 73/861.66 |
| 6,321,166 | B1 | * | 11/2001 | Evans et al. | 702/50 |
| 7,073,386 | B2 | * | 7/2006 | Shinn | 73/700 |
| 7,201,067 | B2 | * | 4/2007 | Kurtz et al. | 73/861.65 |
| 7,798,018 | B2 | * | 9/2010 | Rombach et al. | 73/861.65 |
| 8,448,515 | B2 | * | 5/2013 | Orleskie | 73/579 |
| 8,601,883 | B2 | * | 12/2013 | Strom | 73/861.24 |
| 2005/0034535 | A1 | * | 2/2005 | Sprague | 73/861.22 |
| 2006/0060001 | A1 | * | 3/2006 | Kurtz et al. | 73/861.65 |
| 2009/0211372 | A1 | * | 8/2009 | Betz | 73/861.65 |
| 2010/0043567 | A1 | * | 2/2010 | Rombach et al. | 73/861.65 |

FOREIGN PATENT DOCUMENTS

EP 0 620 419 A1 10/1994
WO WO 02/41003 A2 5/2002

OTHER PUBLICATIONS

Notification of Transmittal of the International Search Report and the Written Opinion of the International Searching Authority, or the Declaration in related PCT Application No. PCT/US2014/011765, dated Apr. 4, 2014.
Rosemount 485 Annubar Flanged Assembly, Quick Installation Guide #00825-0100-4809, Rev DB, Dec. 2009, 16 pgs.

* cited by examiner

*Primary Examiner* — Harshad R Patel
(74) *Attorney, Agent, or Firm* — Westman, Champlin & Koehler, P.A.

(57) ABSTRACT

A pressure measurement system for measuring pressure in a conduit has a bluff body extending into the conduit. The bluff body has an upstream opening and a downstream opening. An upstream pitot tube is slidably engaged within the bluff body and has an open end positioned in the upstream opening. A downstream pitot tube is slidably engaged within the bluff body and has an open end positioned in the downstream opening. A differential pressure sensor is fluidly coupled to the upstream pitot tube and the downstream pitot tube to measure a pressure difference between the upstream pitot tube and the downstream pitot tube.

20 Claims, 8 Drawing Sheets

PITOT TUBE TRAVERSE ASSEMBLY

BACKGROUND

The present invention relates to measurement of flow of a process fluid in an industrial process. More specifically, the present invention relates to measuring a cross-section of a flow path.

In industrial processes, it is common to measure the flow rate of a process fluid flowing through a conduit. Typically, the flow rate varies across a cross-section of the conduit. Thus, to obtain an accurate measurement of the flow rate, measurements must be taken at different cross-sectional positions within the conduit. Traditionally, such cross-sectional measurements were made by traversing a pitot along a diameter of the conduit. At each of a plurality of positions along the traverse, a pressure reading is taken that is used to determine the flow rate at that position.

Pitot traverses are sometimes performed at a location where an averaging pitot tube is to be inserted to calibrate the output of the averaging pitot tube. An averaging pitot tube provides an average pressure difference between an upstream section of the tube and a downstream section of the tube across a cross-section of the conduit. Averaging pitot tubes typically have a different profile from pitot tubes used to perform pitot traverses and as such interfere with the flow in a different way than the pitot tubes used to perform the pitot traverse. As a result, the pitot traverse may provide a less accurate measure of the cross-section of the flow path when an averaging pitot tube is present and thus may not provide accurate calibration data.

The discussion above is merely provided for general background information and is not intended to be used as an aid in determining the scope of the claimed subject matter. The claimed subject matter is not limited to implementations that solve any or all disadvantages noted in the background.

SUMMARY

A pressure measurement system for measuring pressure in a conduit has a bluff body extending into the conduit. The bluff body has an upstream opening and a downstream opening. An upstream pitot tube is slidably engaged within the bluff body and has an open end positioned in the upstream opening. A downstream pitot tube is slidably engaged within the bluff body and has an open end positioned in the downstream opening. A differential pressure sensor is fluidly coupled to the upstream pitot tube and the downstream pitot tube to measure a pressure difference between the upstream pitot tube and the downstream pitot tube.

A pitot traverse assembly has a first pitot tube, a second pitot tube and a bluff body having a length wherein the first pitot tube and the second pitot tube are both movable within the bluff body such that an open end of the first pitot tube and an open end of the second pitot tube are capable of being positioned at different positions along the length of the bluff body.

A method includes fixing a casing within a conduit and passing fluid through the conduit. An upstream pitot tube and a downstream pitot tube are moved within the casing and pressure differences between the upstream pitot tube and the downstream pitot tube are determined at a plurality of positions within the casing such that a profile of pressure differences across a diameter of the conduit is established.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

To provide an accurate cross-section of a flow in a conduit, embodiments described below provide two slidable pitot tubes within a bluff body that has a profile that is similar to the profile of a pitot averaging housing such as an Annubar® housing provided by Rosemount Inc. The two pitot tubes can be slidably moved together within the bluff body to different positions along the length of the bluff body. At each of the plurality of positions, a differential pressure can be sensed that can be used to determine the flow values at that position. In accordance with some embodiments, the flow values at the plurality of positions can then be used to calibrate the average flow values produced by an averaging pitot sensor. The invention can be used with bluff bodies having any desired configuration and is not limited to the configurations illustrated herein.

Because the pitot tubes are within a bluff body that has a similar profile to the housing of an averaging pitot sensor, changes in the flow caused by an averaging pitot sensor are incorporated in the measurement of the cross-section flow. Thus, the resulting cross-section flow values are a more accurate reflection of the cross-section flow that will be present when the averaging pitot sensor is inserted in the flow. In addition, because the pitot tubes are located within the bluff body, the pitot tubes are supported by the bluff body so that they are not deflected by high velocity flow in the conduit. As a result, the slidable pitot tubes of the embodiments described below can be used to provide cross-sections of flow paths in high velocity flows.

Figure 1:
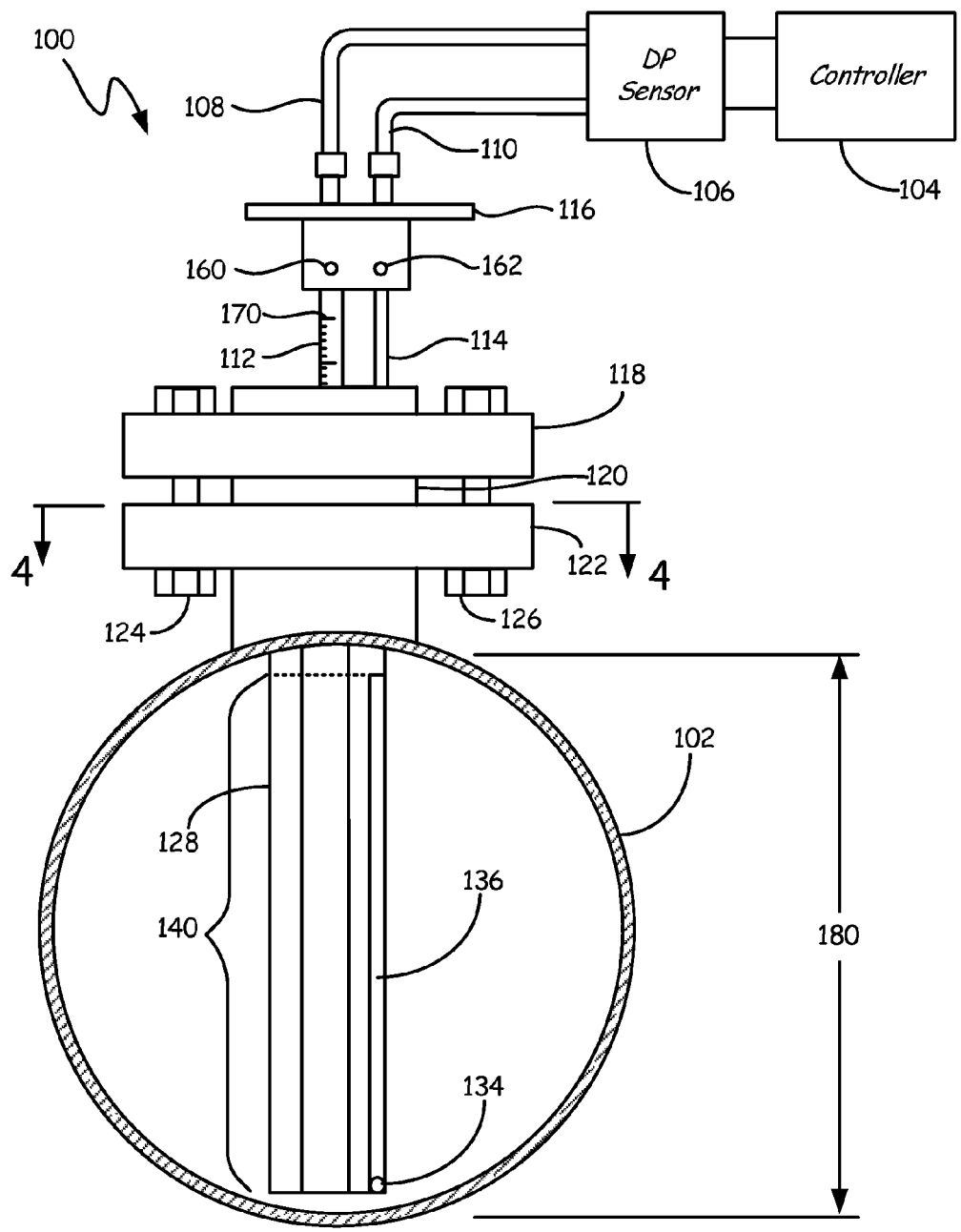
FIG. 1 is a downstream view of a pressure measurement system.
Figure 2:
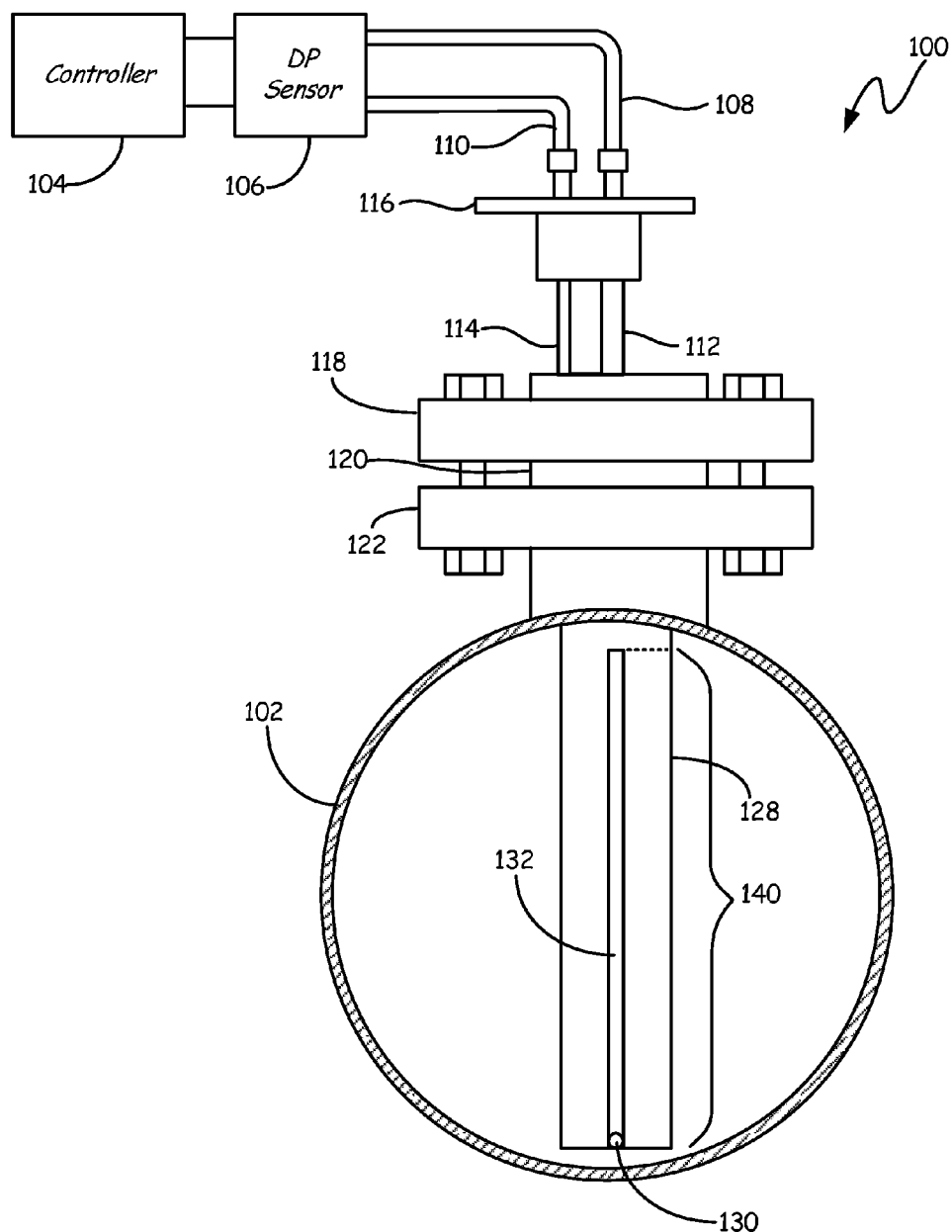
FIG. 2 is an upstream view of the pressure measurement system of FIG. 1.
Figure 3:
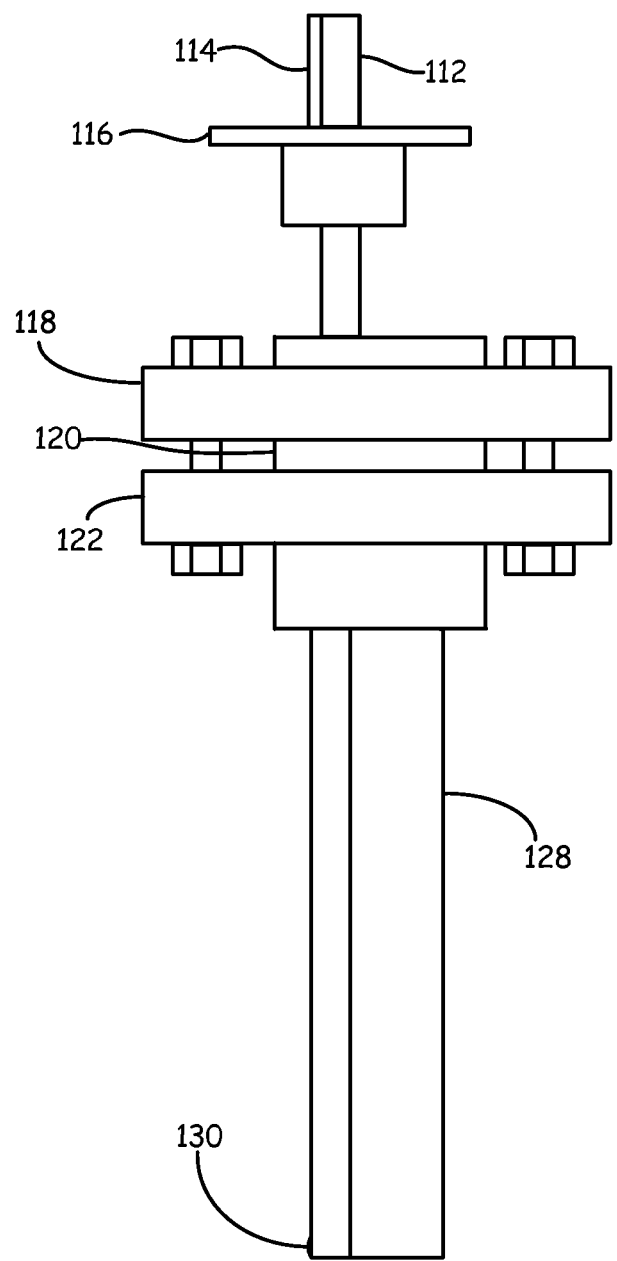
FIG. 3 is a side view of the pressure measurement systems of FIGS. 1 and 2 with the sensor, controller and conduit removed for clarity.

According to one embodiment, FIG. 1 provides a downstream view and FIG. 2 provides an upstream view of a pressure measurement system 100 that is mounted on a conduit 102 to measure differential pressure values of a process fluid flowing through conduit 102 in a direction out of the page of FIG. 1. Measurement system 100 includes a controller 104, differential pressure sensor 106, impulse piping 108 and 110, slidable upstream pitot tube 112, slidable downstream pitot tube 114, brace or holder 116, sensor flange 118, gasket 120, mounting flange 122, stud and nut assemblies 124 and 126 and bluff body or outer casing 128. Pitot tubes 112 and 114, brace 116, sensor flange 118, gasket 120, mounting flange 122, stud and nut assemblies 124 and 126 and bluff body 128 together form a pitot traverse assembly. FIG. 3 provides a side view of the pitot traverse assembly.

Pitot tube 112 has an open end 130 that extends into an upstream slot 132 in bluff body 128 as shown in FIG. 2. Pitot tube 114 has an open end 134 that extends into a downstream slot 136 in bluff body 128 as shown in FIG. 1. The positions of open ends 130 and 134 of pitot tubes 112 and 114 can be moved along a length 140 of bluff body 128. At each position along length 140, open ends 130 and 134 are exposed to the pressure of the fluid and that pressure is transmitted through pitot tubes 112 and 114 and through impulse piping 108 and 110 to differential pressure sensor 106. In other words, differential pressure sensor 106 is fluidly coupled to open ends 130 and 134 through impulse piping 108 and 110 and pitot tubes 112 and 114. Thus, at each position along length 140, open end 130 provides an upstream pressure to differential pressure sensor 106 and open end 134 provides a downstream pressure to differential pressure sensor 106. Using the upstream pressure and the downstream pressure, differential pressure sensor 106 produces a differential pressure signal that is used by controller 104 to determine a flow value at each position of open ends 130 and 134 along length 140. In accordance with one embodiment, the flow value is a flow velocity determined as: $V=\sqrt{\Delta P/\rho}$, where V is the flow velocity, $\Delta P$ is the differential pressure value from differential pressure sensor 106 and $\rho$ is the density of the fluid.

Due to variations in the flow within the conduit, the pressure difference measured by differential pressure sensor 106 will typically be different for different positions of open ends 130 and 134 along length 140. As a result, controller 104 will produce different flow values for different positions along length 140. The resulting collection of flow values is referred to as a cross-section of a flow path through conduit 102.

Figure 4:
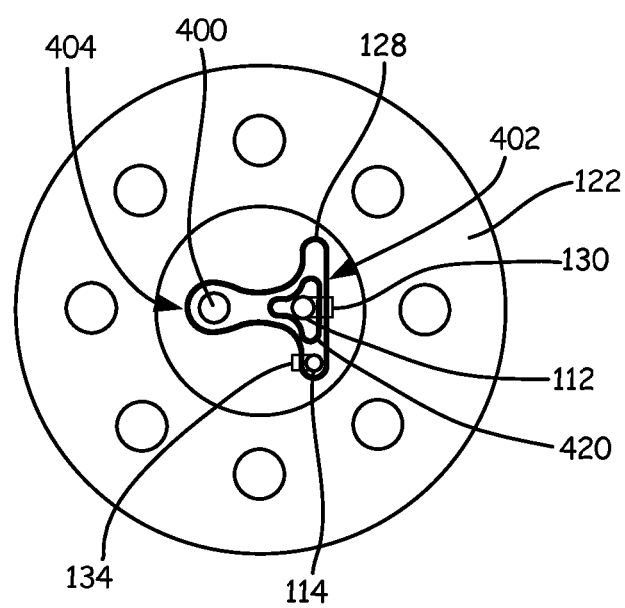
FIG. 4 is a sectional top view of the pitot traverse assembly along lines 4-4 of FIG. 1.

FIG. 4 shows a top sectional view along lines 4-4 of FIG. 1 showing bluff body 128, and pitot tubes 112 and 114 in further detail. As shown in FIG. 4, bluff body 128 in this embodiment is a T-shaped body with an upstream end 402 and a downstream end 404. Downstream end 404 preferably includes a sealed thermowell 400, which can accommodate a resistive temperature device to measure the temperature of the fluid and the conduit. As shown in FIG. 4, pitot tube 112 is positioned within an isolating chamber 420 and has a bent bottom end which forms open end 130 in the upstream direction. Pitot tube 114 has a bent bottom end which forms open end 134 in a downstream direction. Thus, pitot tube 112 is an upstream pitot tube and pitot tube 114 is a downstream pitot tube. Isolating chamber 420 prevents the flow from passing through bluff body 128 from slot 132 to slot 136 and thereby better isolates downstream pitot tube 114 from upstream pitot tube 112.

Figure 5:
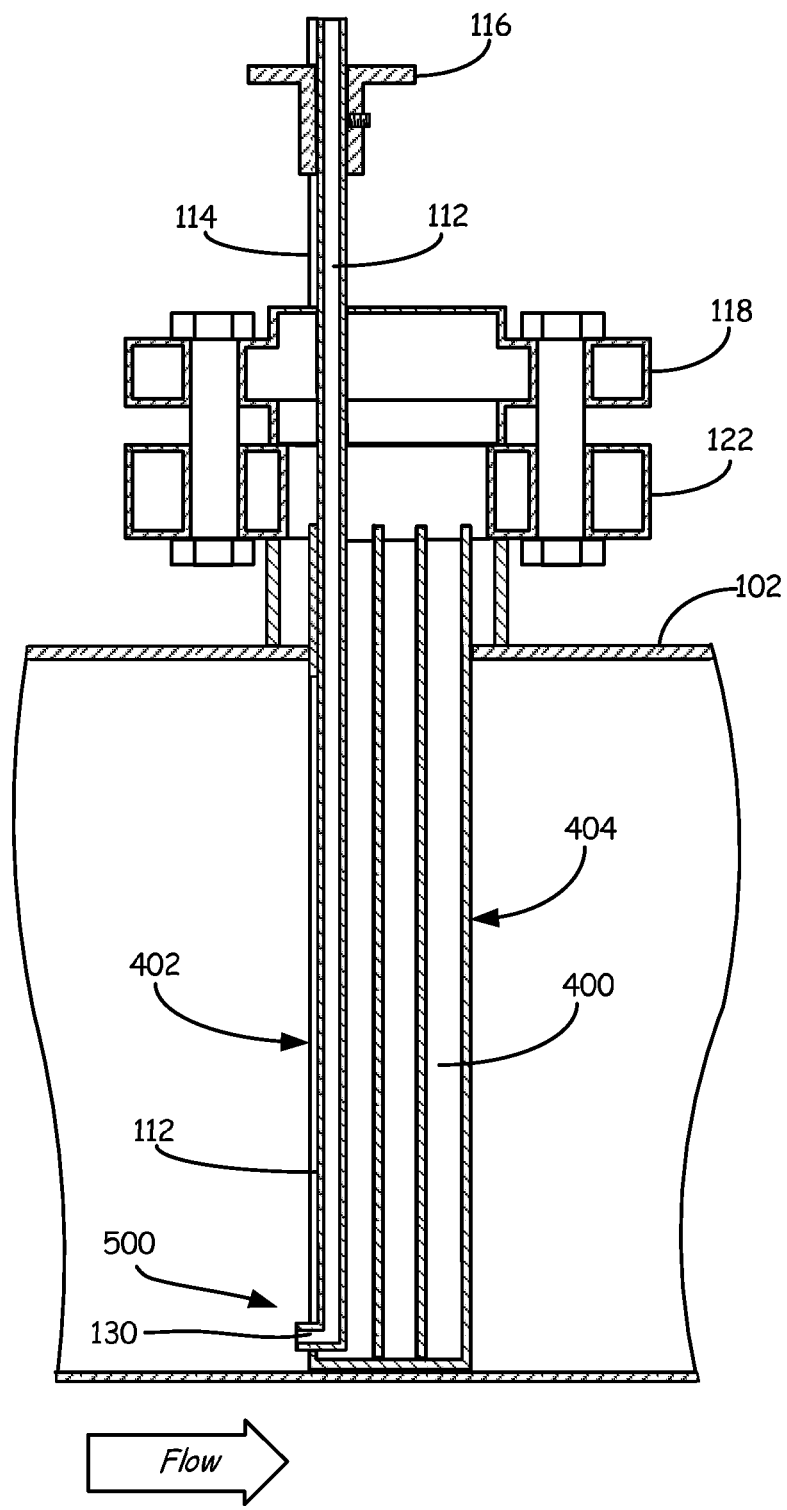
FIG. 5 is a sectional right side view of a pitot traverse assembly with pitot tubes in a first position with the bluff body.
Figure 7:
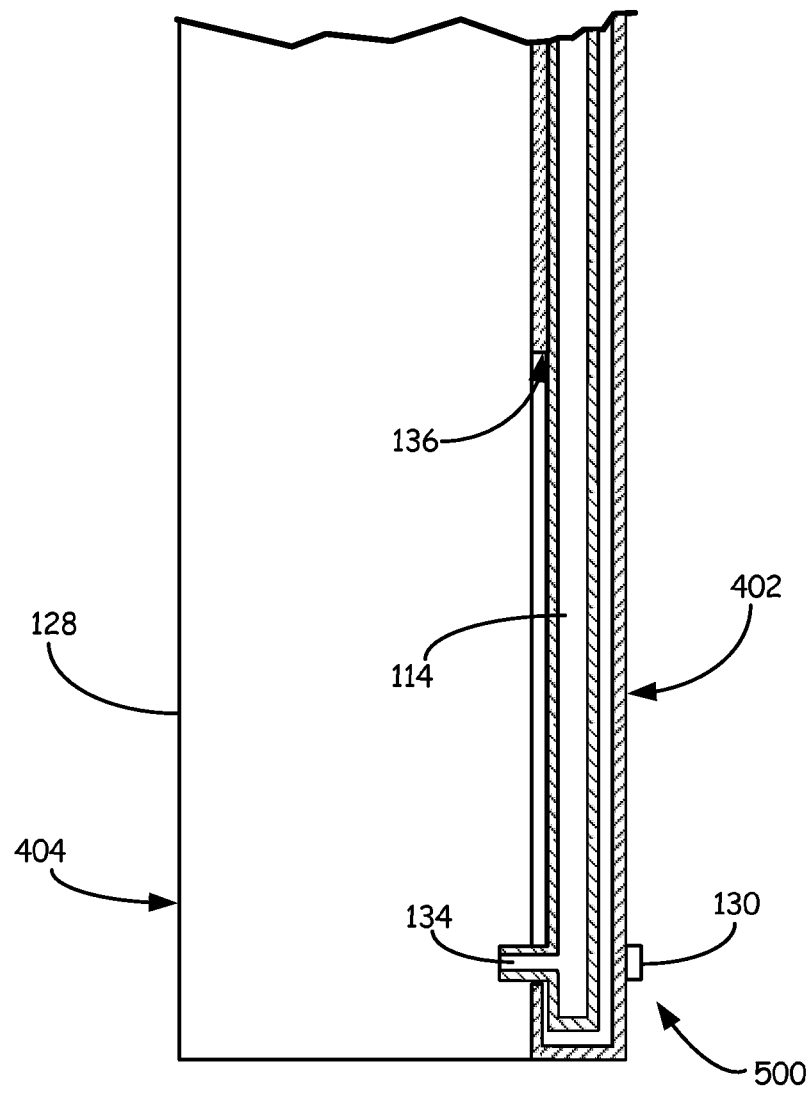
FIG. 7 is an expanded sectional left side view of the pitot traverse assembly.

FIG. 5 shows a cross-sectional right side view and FIG. 7 shows an expanded cross-sectional left side view of the pitot traverse assembly with the pitot tubes 112 and 114 in a bottom position 500 within bluff body 128. In FIG. 5, a cross-section of pitot tube 112 and open end 130 is shown and in FIG. 7 a cross-section of pitot tube 114 and open end 134 are shown.

Figure 6:
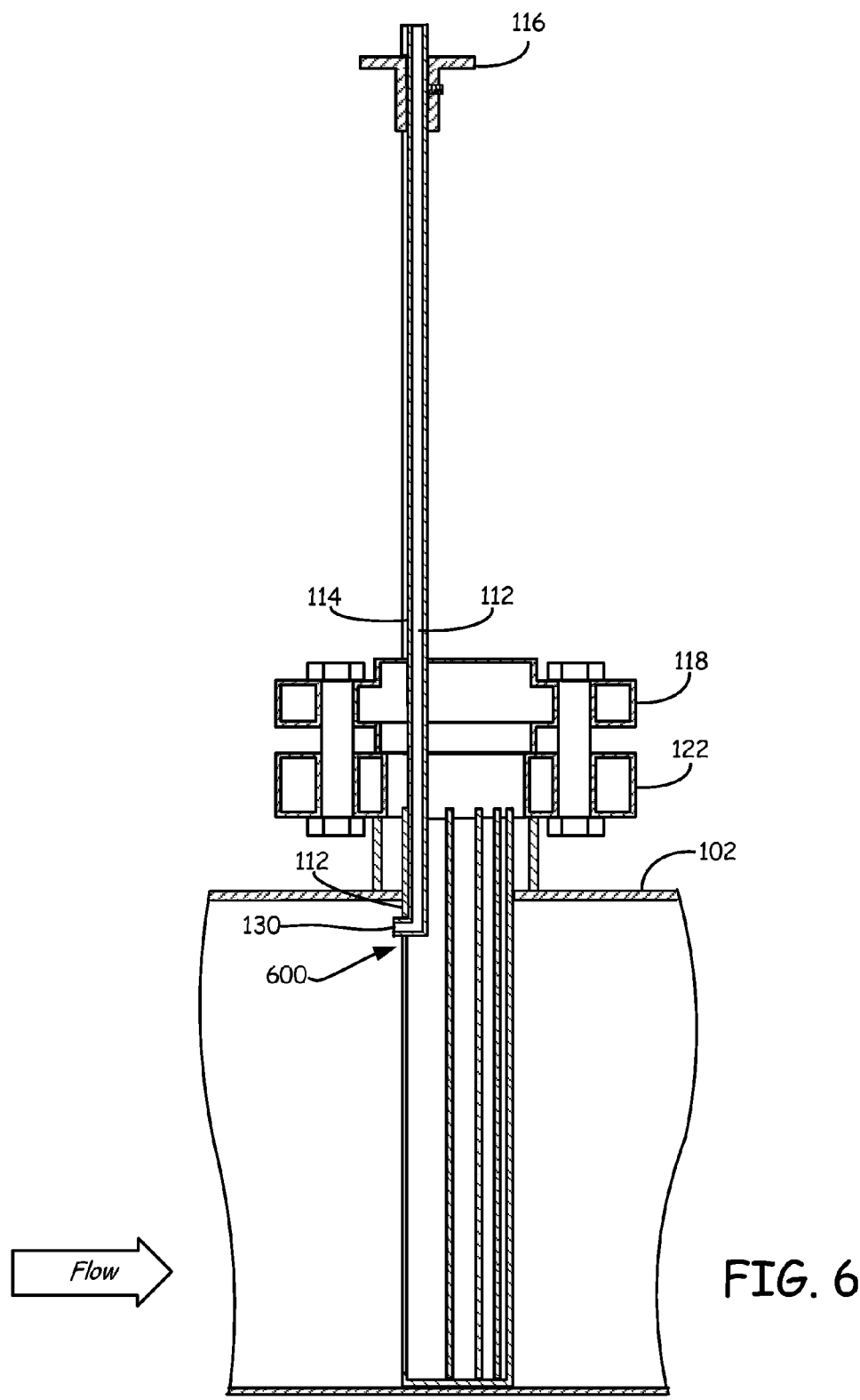
FIG. 6 is a sectional right side view of the pitot traverse assembly with pitot tubes in a second position within the bluff body.

FIG. 6 provides a cross-sectional right side view showing pitot tubes 112 and 114 in an upward position 600. Pitot tubes 112 and 114 may be moved by applying an upward force on either of pitot tubes 112 or 114 or on brace 116 which is attached to both pitot tubes 112 and 114 by set screws 160 and 162 as shown in FIG. 1. Thus, brace/holder 116 moves in unison with pitot tubes 112 and 114 and ensures that pitot tubes 112 and 114 move in unison with each other. As a result, when open end 130 moves upward to a new position, open end 134 of downstream pitot tube 114 moves up by the same amount. As a result, open ends 130 and 134 of pitot tubes 112 and 114 are maintained at the same cross-sectional position within conduit 102. The position of the open ends 130 and 134 within bluff body 128 and conduit 102 can be determined using markings 170 (FIG. 1) on the exterior of pitot tube 112. Although the markings are shown on pitot tube 112, they may alternatively or in addition be shown on pitot tube 114.

Although not shown in FIGS. 5, 6, and 7, impulse piping 108 and 110 and differential pressure sensor 106 also move upward and downward with pitot tubes 112 and 114 so as to maintain the connection between impulse tubing 108 and pitot tube 112 and between impulse tubing 110 and pitot tube 114. As those skilled in the art will recognize, a movable support structure may support differential pressure sensor 106 and impulse piping 108 and 110 to accommodate such movement. In accordance with further embodiments, controller 104 may also move with pitot tubes 112 and 114 and may be incorporated in a same casing as differential pressure sensor 106.

In accordance with various embodiments, a casing such as bluff body or outer casing 128 is fixed within a conduit 102 and fluid is passed through the conduit. An upstream pitot tube 112 and a downstream pitot tube 114 are moved within casing 128 and pressure differences are determined between the upstream pitot tube 112 and the downstream pitot 114 at a plurality of positions within the casing 128 such that a profile of pressure differences across a diameter 180 of conduit 102 is established. The profile of pressure differences is used to determine flow values at the plurality of positions. The upstream pitot tube 112 and the downstream pitot tube 114 are connected together outside of casing 128 by a brace or holder 116 such that the upstream pitot tube 112 and the downstream pitot tube 114 move in unison. At least one of the upstream pitot tube 112 and the downstream pitot tube 114 have markings 170 to indicate the position of the pitot tubes in the casing. The casing also includes a thermowell capable of housing a resistance temperature device so that the temperature of the thermowell can be measured. This temperature may be used to determine the density of the fluid when determining flow values such as flow velocities. The casing includes two slots 132 and 136 with an upstream slot 132 having an open end 130 of the upstream pitot tube 112 positioned within it and a downstream slot 136 having an open end 134 of the downstream pitot tube 114 positioned within it.

The flow values determined at the various positions across diameter 180 of conduit 102 can be used to calibrate flow values produced from pressure readings of an averaging pitot sensor. In accordance with one embodiment, the calibration process begins by performing the pitot traverse described above in the desired location for the averaging pitot sensor. After the pitot traverse is completed, the averaging pitot sensor is inserted into the flow in place of the pitot traverse assembly.

Typically, an averaging pitot sensor includes one or more upstream and downstream openings that are open to the flow at a plurality of locations across the diameter of the conduit. In accordance with one embodiment, the upstream openings are slots that extend along at least a portion of the diameter of the conduit and the downstream openings are holes that are spaced apart along at least a portion of the diameter. The upstream openings are fluidly connected together within the averaging pitot sensor to provide an average upstream pressure and the downstream openings are fluidly connected together within the averaging pitot sensor to provide an average downstream pressure. The average upstream pressure and the average downstream pressure are provided to a differential pressure sensor, which generates a pressure difference signal based on the difference in pressure between the average upstream pressure and the average downstream pressure. The pressure difference signal is provided to a controller, which uses the pressure difference signal to determine an average flow values such as an average flow velocity, which is determined as: $V_{avg}=\sqrt{\Delta P_{avg}/\rho}$, where $V_{avg}$ is the average flow velocity, $\Delta P_{avg}$ is the differential pressure between the average upstream pressure and the average downstream pressure and $\rho$ is the density of the fluid.

The average flow velocity determined from the averaging pitot sensor is then used with the flow velocities formed during the pitot traverse to produce a calibration value. Under one embodiment, the calibration value is computed as: $k=\Sigma_{i=1}^{N}V_{i}/(NV_{avg})$ where k is the calibration value, $V_i$ is the flow velocity determined from the ith position of the traverse, N is the total number of positions in the traverse, and $V_{avg}$ is the average flow velocity determined using the averaging pitot sensor. The resulting calibration value may be used to calibrate different flow values such as flow velocity, volumetric flow rate and mass flow rate that are later determined from the differential pressure generated by the averaging pitot sensor.

Figure 8:
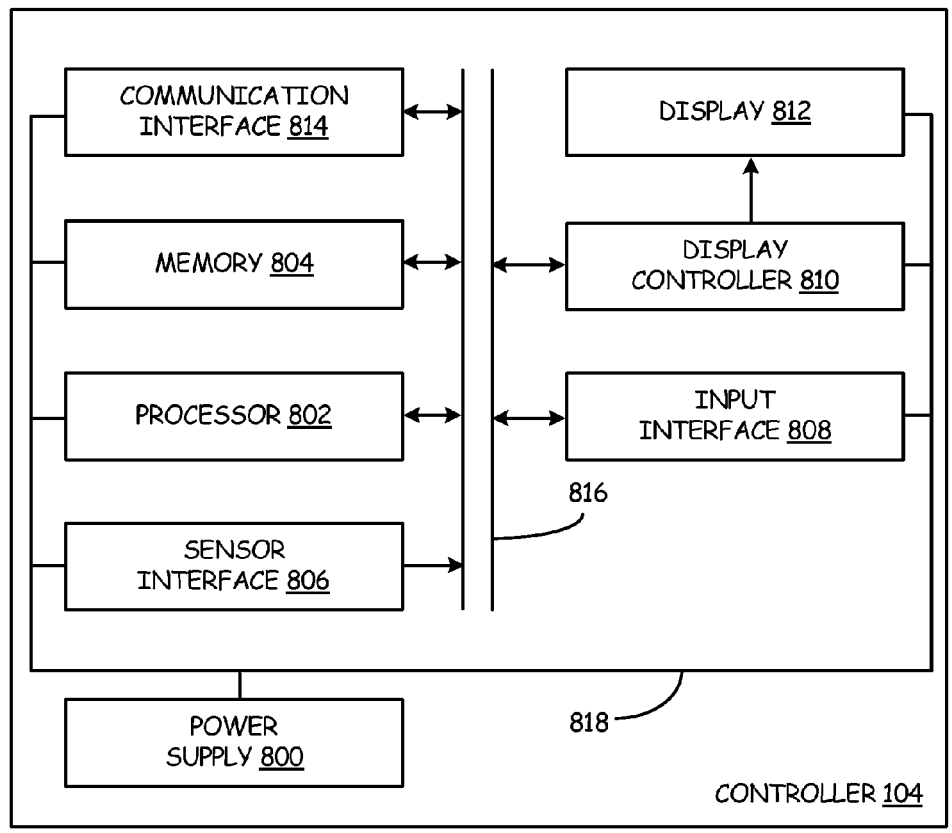
FIG. 8 is a block diagram of a controller in accordance with one embodiment.

FIG. 8 provides a block diagram of elements in controller 104 in accordance with one embodiment. Controller 104 includes a power supply 800, a processor 802, a memory 804, a sensor interface 806, a communication interface 814, an input interface 808, a display controller 810, a display 812, a communication bus 816, and a power bus 818. In accordance with one embodiment, processor 802, memory 804, sensor interface 806, input interface 808, display controller 810 and communication interface 814 are each connected to communication bus 816.

Power supply 800 provides power to controller 104 and can take the form of a battery pack, an independent connection to an external power source, or a connection to a loop communication system that provides both power and information. Power supply 800 distributes power to the various components of controller 104 through power bus 818, which is connected to each of the components of controller 104. In accordance with some embodiments, the amount of power provided on power supply 800 is limited so that controller 104 is intrinsically safe and can be used in hazardous environments without causing an explosion.

Sensor interface 806 receives pressure and temperature signals from differential pressure sensor 106 and the resistive temperature sensor, converts the signals into digital values and provides the digital values to processor 802 on bus 816. Processor 802 may store the sensor values in memory 804 for later use or may use the sensor values immediately to compute one or more of the flow values described above. After computing the flow values, processor 802 may store the flow values in memory 804, communicate the values to a remote processing unit through communication interface 814, and/or display the values on display 812 using display controller 810.

Display 812 provides one or more user interfaces that can display the flow values produced by processor 802. In addition, display 812 can be used with an input device, such as a touchscreen on display 812, a keyboard or a pointing device, to allow a user to indicate the position of the pitot tubes within the conduit. Signals from the input device are received by input interface 808, which provides the input values to processor 802. In accordance with one example embodiment, the user interface on display 812 provides selectable icons that allow the user to designate the current position of the pitot tubes using the input device. The user interface also displays the current pressure readings and computed flow values for the designated position. Other examples of user interfaces include graphs showing the cross-section of the flow across the conduit and fields showing a computed calibration value for the averaging pitot sensor.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims. In one example configuration, the pitot tubes can be removed and the pressure ports can be coupled to the averaging pitot sensor. In some instances, it may be desirable to obtain an average differential pressure over the flow profile rather than discrete measurements. Further, in one configuration, calibration is performed prior to installation, for example, during manufacture of the device.

What is claimed is:

1. A pressure measurement system for measuring pressure in a conduit, comprising:
    a bluff body extending into the conduit and having an upstream opening and a downstream opening;
    an upstream pitot tube slidably engaged within the bluff body and having an open end positioned in the upstream opening such that the upstream pitot tube is postionable at different positions along a length of the bluff body;
    a downstream pitot tube slidably engaged within the bluff body and having an open end positioned in the downstream opening such that the downstream pitot tube is positionable at different positions along the length of the bluff body; and
    a differential pressure sensor fluidly coupled to the upstream pitot tube and the downstream pitot tube to measure a pressure difference between the upstream pitot tube and the downstream pitot tube for each of a plurality of positions of the upstream pitot tube and the downstream pitot tube along the length of the bluff body to develop a profile of pressure differences across the conduit.

2. The pressure measurement system of claim 1 wherein the differential pressure sensor measures a first pressure difference when the upstream pitot tube and the downstream pitot tube are in a first position along the length of the bluff body and wherein the differential pressure sensor measures a second pressure difference when the upstream pitot tube and the downstream pitot tube are in a second position along the length of the bluff body.

3. The pressure measurement system of claim 1 wherein the upstream opening and the downstream opening are both slots.

4. The pressure measurement system of claim 1 wherein at least one of the upstream pitot tube and the downstream pitot tube further comprises exterior markings that indicate the position of at least one of the upstream pitot tube and the downstream pitot tube within the bluff body.

5. The pressure measurement system of claim 1 wherein the upstream pitot tube and the downstream pitot tube are connected by a holder exterior to the conduit such that the upstream pitot tube and the downstream pitot tube move in unison within the bluff body.

6. The pressure measurement system of claim 1 wherein the bluff body comprises a T-shaped body.

7. The pressure measurement system of claim 6 wherein the bluff body further comprises a thermowell.

8. A pitot traverse assembly comprising:
   a first pitot tube;
   a second pitot tube; and
   a bluff body having a length wherein the first pitot tube and the second pitot tube are both slidably engaged within the bluff body such that an open end of the first pitot tube and an open end of the second pitot tube are positionable at different positions along the length of the bluff body as part of determining flow values at the different positions along the length of the bluff body.

9. The pitot traverse assembly of claim 8 further comprising an isolating chamber that prevents fluid flow through the bluff body wherein the first pitot tube is positioned within the isolating chamber.

10. The pitot traverse assembly of claim 8 wherein the open end of the first pitot tube is positioned within a first slot of the bluff body and wherein the open end of the second pitot tube is positioned within a second slot of the bluff body.

11. The pitot traverse assembly of claim 10 wherein the first slot is located in an upstream position on the bluff body and the second slot is located in a downstream position on the bluff body.

12. The pitot traverse assembly of claim 8 wherein the bluff body further comprises a sealed thermowell.

13. The pitot traverse assembly of claim 8 further comprising a brace that is connected to the first pitot tube and the second pitot tube and that moves in unison with the first pitot tube and the second pitot tube.

14. The pitot traverse assembly of claim 8 wherein at least one of the first pitot tube and the second pitot tube comprise exterior markings that indicate the position of at least one of the first pitot tube and the second pitot tube within the bluff body.

15. A method comprising:
   fixing a casing within a conduit;
   passing fluid through the conduit;
   slidably positioning an upstream pitot tube and a downstream pitot tube within the casing and determining pressure differences between the upstream pitot tube and the downstream pitot tube at a plurality of positions along a length of the casing such that a profile of pressure differences at different positions across a diameter of the conduit is established.

16. The method of claim 15 wherein the upstream pitot tube and the downstream pitot tube are connected together outside of the casing such that the upstream pitot tube and downstream pitot tube move in unison.

17. The method of claim 15 wherein at least one of the upstream pitot tube and the downstream pitot tube comprise markings that indicate the position of the at least one upstream pitot tube and downstream pitot tube.

18. The method of claim 15 further comprising using the profile of pressure differences to determine a calibration value for an averaging pitot sensor.

19. The method of claim 15 wherein the casing comprises a first slot that an end of the upstream pitot tube is positioned within.

20. The method of claim 19 wherein the casing comprises a second slot that an end of the downstream pitot tube is positioned within.

\* \* \* \* \*